US012771501B2

(12) United States Patent
Ramakrishna et al.

(10) Patent No.: US 12,771,501 B2
(45) Date of Patent: Oct. 20, 2026

(54) SOUNDING REFERENCE SIGNAL ANALYSIS BASED USER MOBILITY ESTIMATION

(71) Applicant: Rakuten Symphony, Inc., Tokyo (JP)

(72) Inventors: Raghavendra Madanahally Ramakrishna, Bangalore (IN); Ronak Bharatkumar Lalwala, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 336 days.

(21) Appl. No.: 18/535,426

(22) Filed: Dec. 11, 2023

(65) Prior Publication Data

US 2025/0192938 A1 Jun. 12, 2025

(51) Int. Cl.
*H04L 5/00* (2006.01)
*H04W 8/02* (2009.01)

(52) U.S. Cl.
CPC ............. *H04L 5/0048* (2013.01); *H04W 8/02* (2013.01)

(58) Field of Classification Search
CPC ...... H04L 5/0048; H04L 5/0051; H04W 8/02; H04B 17/336
See application file for complete search history.

(56) References Cited

U.S. PATENT DOCUMENTS 9,252,934 B2 * 2/2016 Hwang ................. H04W 72/20
11,239,969 B2 * 2/2022 Qin ..................... H04L 27/2613
11,991,693 B2 * 5/2024 Gao ...................... H04L 5/0051
12,113,655 B2 * 10/2024 Marupaduga ............. H04L 5/10
2021/0329673 A1 * 10/2021 Gao .................. H04W 72/0466
2023/0124512 A1 * 4/2023 Marupaduga ....... H04L 25/0226 370/329
2025/0321320 A1 * 10/2025 Jeon ........................ G01S 7/021

* cited by examiner

*Primary Examiner* — Brian T O Connor
(74) *Attorney, Agent, or Firm* — Sughrue Mion, PLLC

(57) ABSTRACT

In general, the current subject matter relates to sounding reference signal analysis based user mobility estimation. In some implementations, sounding reference signal analysis based user mobility estimation includes receiving, via one or more antennas, using at least one processor, a plurality of sounding reference signals from a user equipment that is external to the at least one processor, analyzing, using the at least one processor, the plurality of sounding reference signals during a first time period and a second time period, determining, using the at least one processor, a target correlation value based on analyzing the plurality of sounding reference signals during the first time period and the second time period, and determining, using the at least one processor, based on the target correlation value, a mobility of the user equipment in a geographical area.

20 Claims, 16 Drawing Sheets

SOUNDING REFERENCE SIGNAL ANALYSIS BASED USER MOBILITY ESTIMATION

TECHNICAL FIELD

In some implementations, the current subject matter relates to telecommunications systems, and in particular, to sounding reference signal analysis based user mobility estimation.

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if the mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G standard is currently being developed and deployed. 3GPP cellular technologies like LTE and 5G NR are evolutions of earlier generation 3GPP technologies like the GSM/EDGE and UMTS/HSPA ("Universal Mobile Telecommunications System"/"High Speed Packet Access") digital cellular technologies and allows for increasing capacity and speed by using a different radio interface together with core network improvements.

Cellular networks can be divided into radio access networks and core networks. The radio access network ("RAN") can include network functions that can handle radio layer communications processing. The core network can include network functions that can handle higher layer communications, e.g., internet protocol ("IP"), transport layer and applications layer. In some cases, the RAN functions can be split into baseband unit functions and the radio unit functions, where a radio unit connected to a baseband unit via a fronthaul network, for example, can be responsible for lower layer processing of a radio physical layer while a baseband unit can be responsible for the higher layer radio protocols, e.g., medium access control ("MAC"), radio link control ("RLC"), etc.

In cellular networks, time division duplex (TDD) systems utilize the same frequency band of channel for uplink (UL) and downlink (DL) transmissions. Such a channel is reciprocal. A radio channel is reciprocal or is defined as operating reciprocally if it has the same characteristics in both the uplink and downlink directions. Based on the reciprocal characteristic of the channel, an uplink transmission may be utilized to determine a channel estimate, which in turn may be utilized to calculate various parameters, e.g., beamforming, for a downlink transmission. It is noted that a designated amount of slots are reserved for UL and another designated amount of slots are reserved for DL and slots designated for UL may not be utilized for DL and slots designated for DL may be utilized for UL. In operation, the radio channel may only be measured using the TDD slots that are designated for UL. As such, a processing operation may have to be performed in order to apply the beamforming parameter of the UL to the DL.

Such a processing operation causes a delay of a few milliseconds, e.g., 2-3 milliseconds, during which the channel may experience changes. During this delay, if the user of a user equipment (UE) changes his location, the radio channel changes, thereby rendering beamforming obsolete, inaccurate, and ineffective. As such, there is a need for accurately estimating and tracking user mobility. Several techniques, including doppler estimation, may be utilized to track movement of a user of a UE, but doppler estimation is deficient at least because it fails to account for variation of the oscillator (system clock) of the UE, which may be, in instances, larger than the Doppler variation.

Accordingly, a way of accurately determining whether a user is mobile or stationary, under various conditions, is contemplated.

SUMMARY

In some implementations, the current subject matter relates to a computer-implemented method. The method can include processing, using at least one processor, a signal received by one or more antennas. The signal can include receiving, via one or more antennas, using at least one processor, a plurality of sounding reference signals from a user equipment that is external to the at least one processor, analyzing, using the at least one processor, the plurality of sounding reference signals during a first time period and a second time period, determining, using the at least one processor, a target correlation value based on analyzing the plurality of sounding reference signals during the first time period and the second time period, and determining, using the at least one processor, based on the target correlation value, a mobility of the user equipment in a geographical area.

The method may allow for determining a mobility of a user equipment, namely whether the user is moving or stationary within a geographic area.

In some implementations, the current subject matter can include one or more of the following optional features.

In some implementations, the mobility of the UE in the geographical area can correspond to one of the UE being mobile or the user being stationary.

In some implementations, each of the first time period and the second time period can have a length of 20 milliseconds.

In some implementations, the analyzing of the plurality of sounding references signals can include determining a first candidate correlation values associated with a first set of the plurality of sounding reference signals received by the one or more antennas during the first time period, and determining a second candidate correlation values associated with a second set of the plurality of sounding reference signals received by the one or more antennas during the second time period. Further, the determining of the target correlation value can include correcting for one or more timing errors associated with the user equipment. Further, the correcting for the one or more timing errors can include comparing the first candidate correlation values with a correlation threshold value, selecting a first subset of the first candidate correlation values, the first subset including candidate correlation values that satisfy the correlation threshold value, and determining a first subset average value using the candidate correlation values included in the first subset that satisfy the correlation value threshold. Further, the determining of the target correlation value can include comparing the second candidate correlation values with the correlation threshold value, selecting a second subset of the second candidate correlation values, the second subset including candidate correlation values that satisfy the correlation threshold value. Further, a second subset average value can be determined using the candidate correlation values included in the second subset that satisfy the correlation value threshold. Further, the first subset average value and the second subset average value can be compared and a higher of the first subset average value and the second subset average value may be selected, and the higher of the first subset average value and the second subset average value can be the target correlation value.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

The current subject matter can provide for systems and methods that can be implemented in wireless communications systems. Such systems can include various wireless communications systems, including 5G New Radio communications systems, long term evolution communication systems, etc.

In some implementations, the current subject matter relates to determining a mobility of a user equipment, namely whether the user is moving or stationary within a geographic area. In some implementations, the mobility of the user equipment may be determined by a base station, which may initially receive a plurality of sounding reference signals from a user device of a user. The base station may then analyze the sounding reference signals and determine a target correlation value which may be representative of the mobility of the user equipment within the geographic area.

One or more aspects of the current subject matter can be incorporated into transmitter and/or receiver components of base stations (e.g., gNodeBs, eNodeBs, etc.) in such communications systems. Further, as stated above, the sounding reference signals may be received from a user equipment such as a smartphone phone, a mobile phone, a laptop, and/or other comparable wireless device that is associated with a user. The following is a general discussion of long-term evolution communications systems and 5G New Radio communication systems.

I. Long Term Evolution Communications System

FIGS. 1*a-c* and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is an evolution of the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard was developed by the 3GPP ("3rd Generation Partnership Project").

Figure 1A:
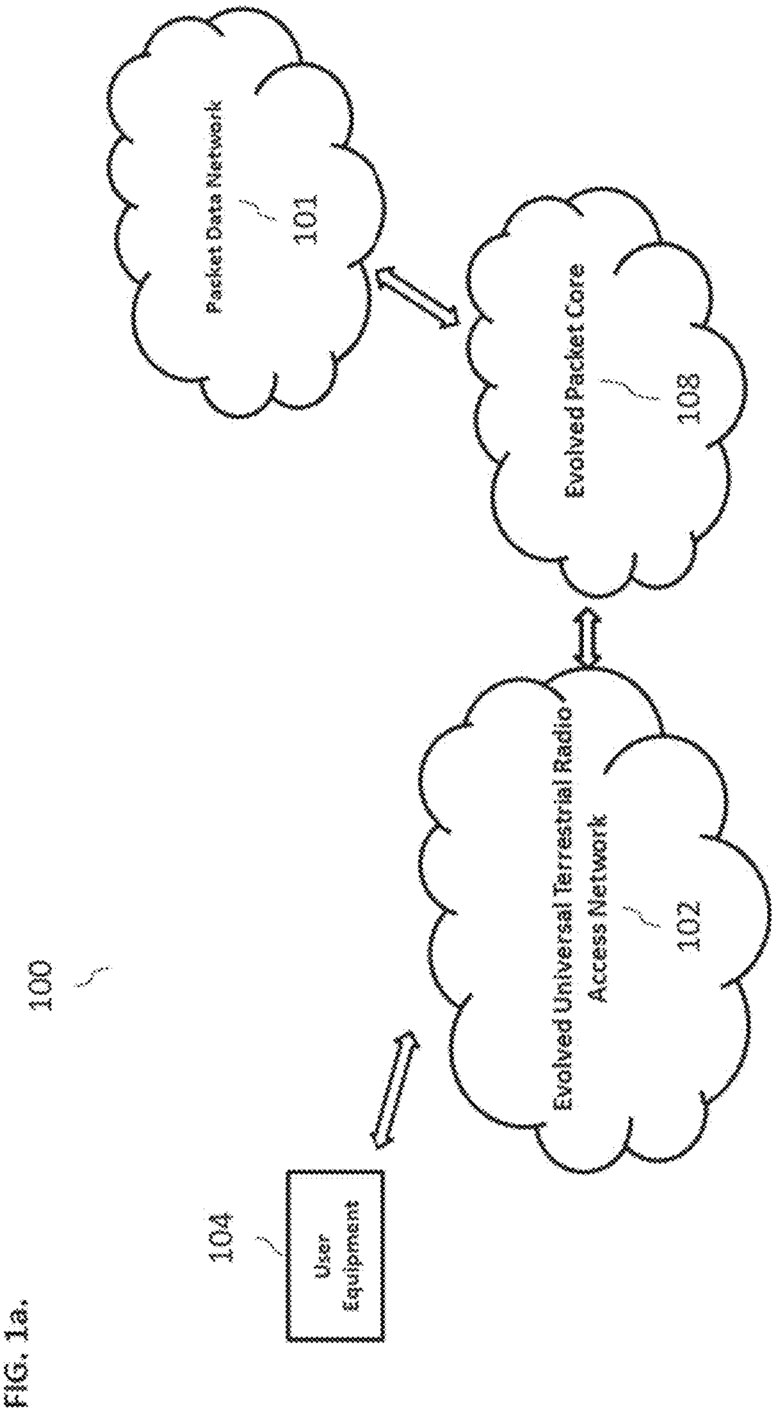
FIG. 1*a* illustrates an exemplary conventional long term evolution ("LTE") communications system.
Figure 1B:
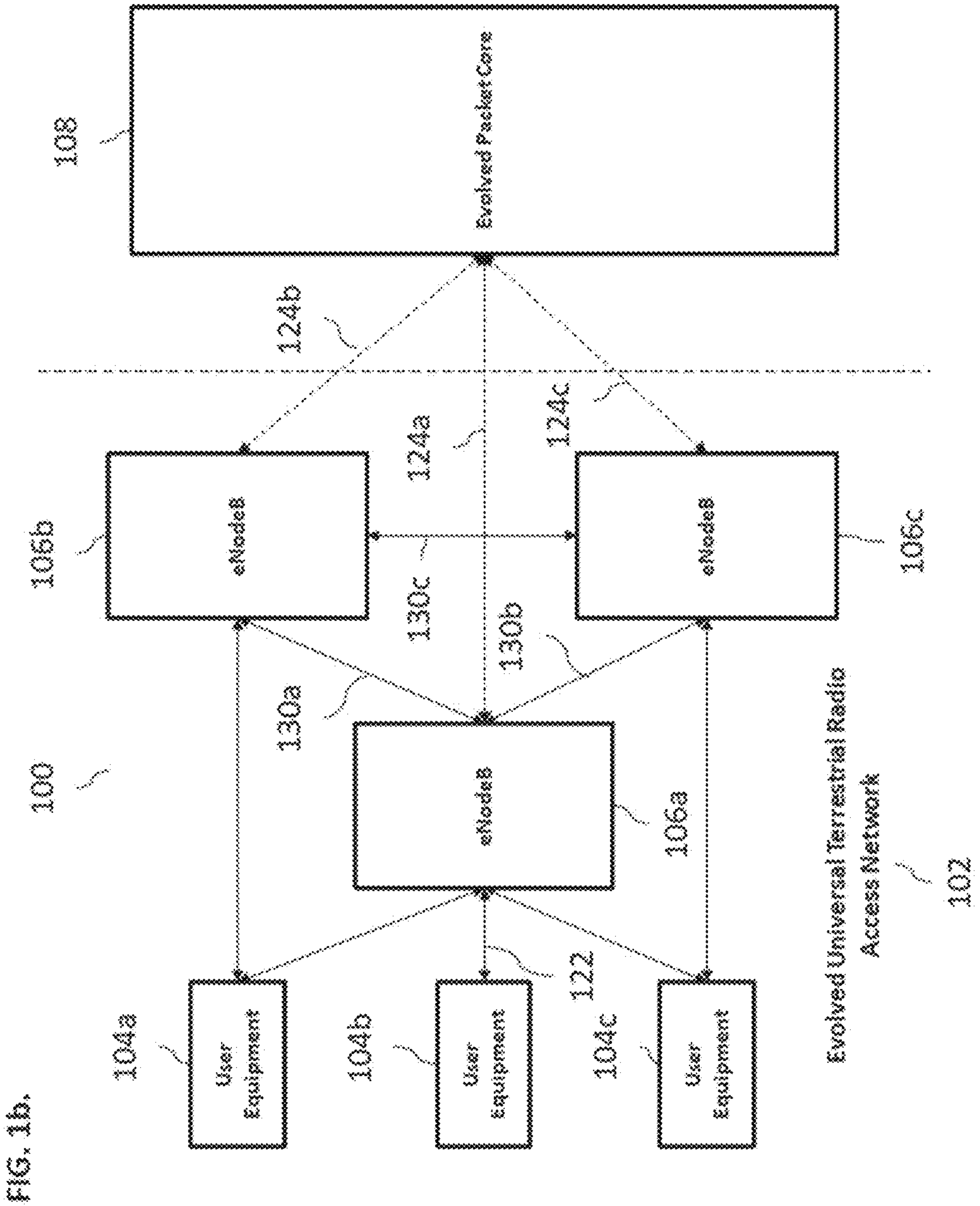
FIG. 1*b* illustrates further detail of the exemplary LTE system shown in FIG. 1*a;*

As shown in FIG. 1*a*, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (106*a*, 106*b*, 106*c*) (as shown in FIG. 1*b*) that provide communication capabilities to a plurality of user equipment 104 (104*a*, 104*b*, 104*c*). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
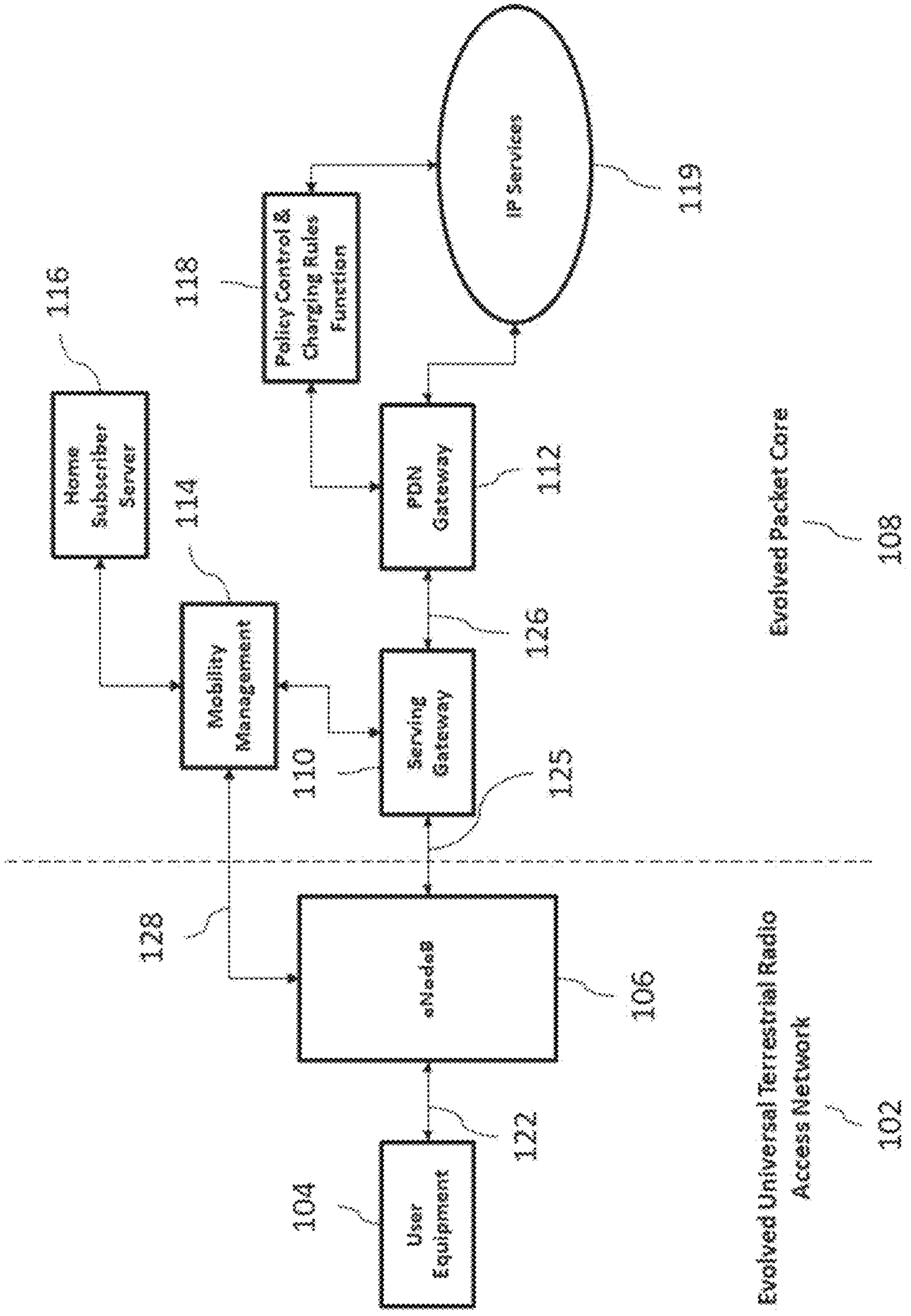
FIG. 1*c* illustrates additional detail of the evolved packet core of the exemplary LTE system shown in FIG. 1*a;*

FIG. 1*b* illustrates further detail of the network 100 shown in FIG. 1*a*. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1*c*) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1*b*, the air interface 122 provides communication between user equipment 104*b* and the eNodeB 106*a*. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1*c*). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130 (130*a*, 130*b*, 130*c*). As shown in FIG. 1*b*, X2 interface 130*a* provides interconnection between eNodeB 106*a* and eNodeB 106*b*; X2 interface 130*b* provides interconnection between eNodeB 106*a* and eNodeB 106*c*; and X2 interface 130*c* provides interconnection between eNodeB 106*b* and eNodeB 106*c*. The X2 interface can be established between two eNodeBs in order to provide an exchange of signals, which can include a load- or interference-related information as well as handover-related information. The eNodeBs 106 communicate with the evolved packet core 108 via an S1 interface 124 (124*a*, 124*b*, 124*c*). The S1 interface 124 can be split into two interfaces: one for the control plane (shown as control plane interface (S1-MME interface) 128 in FIG. 1*c*) and the other for the user plane (shown as user plane interface (S1-U interface) 125 in FIG. 1*c*).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1*c*. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1*a*). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QOS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1*a*).

Figure 1D:
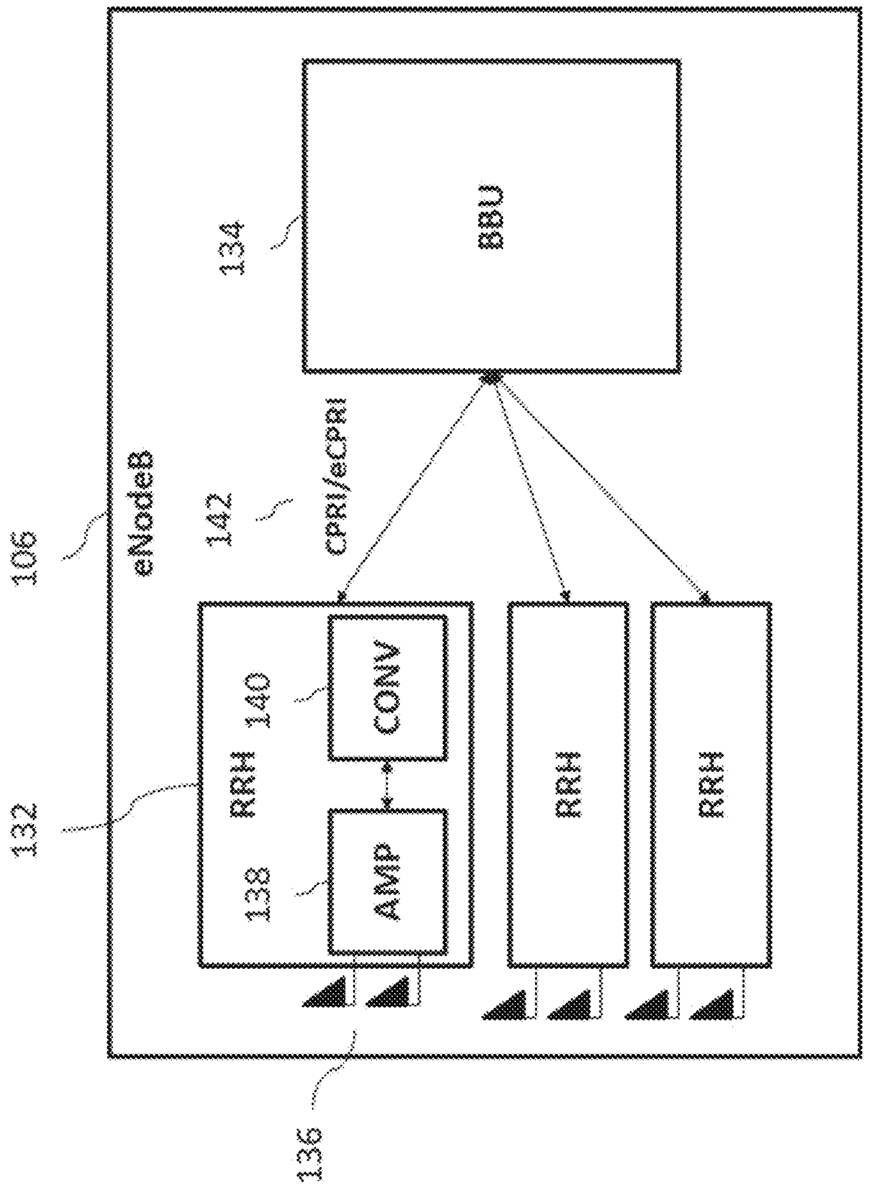
FIG. 1*d* illustrates an exemplary evolved Node B of the exemplary LTE system shown in FIG. 1*a;*

FIG. 1*d* illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI")/enhanced CPRI ("eCPRI") 142 standard specification either using RRH specific custom control and user plane framing methods or using open radio access network ("O-RAN") Alliance compliant Control and User plane framing methods. The operation of the eNodeB 106 can be characterized using the following standard parameters (and specifications): radio frequency band (Band4, Band9, Band17, etc.), bandwidth (5, 10, 15, 20 MHz), access scheme (downlink: OFDMA; uplink: SC-OFDMA), antenna technology (Single user and multi user MIMO; Uplink: Single user and multi user MIMO), number of sectors (6 maximum), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1*d*) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1*d*). Conversely, the RF signals that are received from user equipment 104 are amplified (using AMP 138) and converted (using CONV 140) to digital baseband signals for transmission to the BBU 134.

Figure 2:
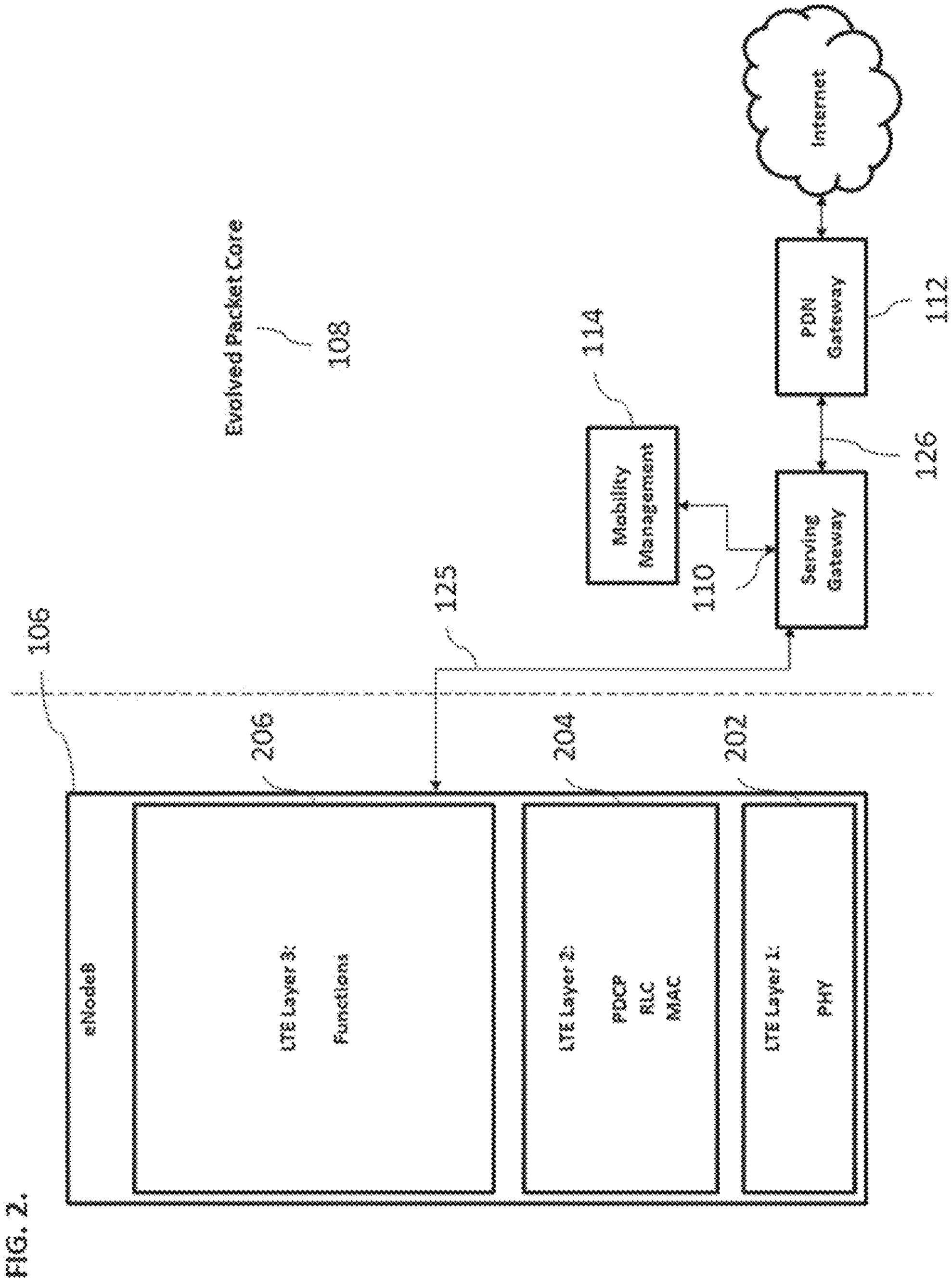
FIG. 2 illustrates further detail of an evolved Node B shown in FIGS. 1*a-d;*

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), and a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1*d*, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

II. 5G NR Wireless Communications Networks

In some implementations, the current subject matter relates to a 5G new radio ("NR") communications system.

The 5G NR is a next telecommunications standard beyond the 4G/IMT-Advanced standards. 5G networks offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when it is not possible to do so with Wi-Fi networks. 5G networks have an improved support of device-to-device communication, lower cost, lower latency than 4G equipment and lower battery consumption, etc. Such networks have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

Figure 3:
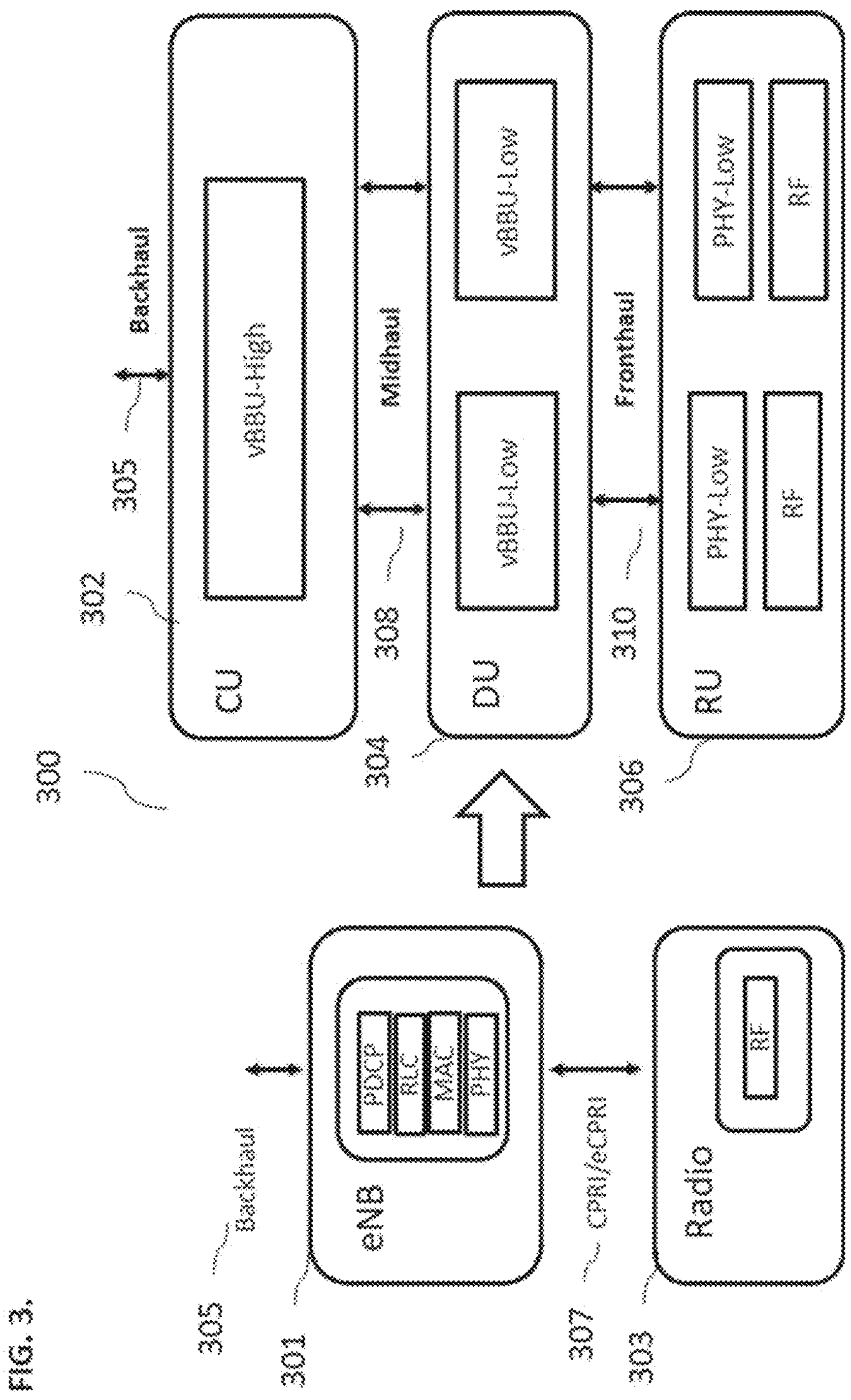
FIG. 3 illustrates an exemplary virtual radio access network, according to some implementations of the current subject matter.

FIG. 3 illustrates an exemplary virtual radio access network 300. The network 300 can provide communications between various components, including a base station (e.g., eNodeB, gNodeB) 301, a radio equipment 307, a centralized unit 302, a digital unit 304, and a radio device 306. The components in the system 300 can be communicatively coupled to a core using a backhaul link 305. A centralized unit ("CU") 302 can be communicatively coupled to a distributed unit ("DU") 304 using a midhaul connection 308. The radio frequency ("RU") components 306 can be communicatively coupled to the DU 304 using a fronthaul connection 310.

In some implementations, the CU 302 can provide intelligent communication capabilities to one or more DUs 308. The units 302, 304 can include one or more base stations, macro base stations, micro base stations, remote radio heads, etc. and/or any combination thereof.

In lower layer split ("LLS") architecture environment, a CPRI bandwidth requirement for NR can be 100 s of Gb/s. CPRI compression can be implemented in the DU and RU (as shown in FIG. 3). In 5G communications systems, compressed CPRI over Ethernet frame is referred to as eCPRI and is the recommended fronthaul network. The architecture can allow for standardization of fronthaul/midhaul, which can include a higher layer split (e.g., Option 2 or Option 3-1 (Upper/Lower RLC split architecture)) and fronthaul with L1-split architecture (Option 7).

In some implementations, the lower layer-split architecture (e.g., Option 7) can include a receiver in the uplink, joint processing across multiple transmission points (TPs) for both DL/UL, and transport bandwidth and latency requirements for ease of deployment. Further, the current subject matter's lower layer-split architecture can include a split between cell-level and user-level processing, which can include cell-level processing in remote unit ("RU") and user-level processing in DU. Further, using the current subject matter's lower layer split architecture, frequency-domain samples can be transported via Ethernet fronthaul, where the frequency-domain samples can be compressed for reduced fronthaul bandwidth.

Figure 4:
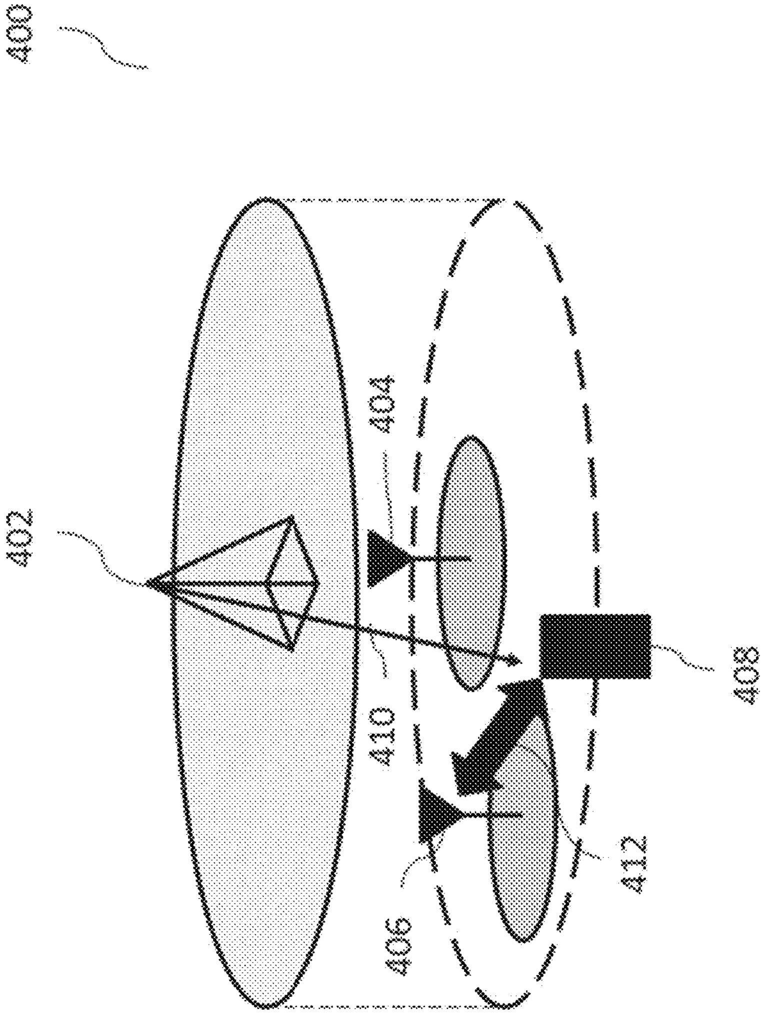
FIG. 4 illustrates an exemplary 3GPP split architecture to provide its users with use of higher frequency bands.

FIG. 4 illustrates an exemplary communications system 400 that can implement a 5G technology and can provide its users with use of higher frequency bands (e.g., greater than 10 GHz). The system 400 can include a macro cell 402 and small cells 404, 406.

A mobile device 408 can be configured to communicate with one or more of the small cells 404, 406. The system 400 can allow splitting of control planes (C-plane) and user planes (U-plane) between the macro cell 402 and small cells 404, 406, where the C-plane and U-plane are utilizing different frequency bands. In particular, the small cells 404, 406 can be configured to utilize higher frequency bands when communicating with the mobile device 408. The macro cell 402 can utilize existing cellular bands for C-plane communications. The mobile device 408 can be communicatively coupled via U-plane 412, where the small cell (e.g., small cell 406) can provide higher data rate and more flexible/cost/energy efficient operations. The macro cell 402, via C-plane 410, can maintain good connectivity and mobility. Further, in some cases, LTE and NR can be transmitted on the same frequency.

Figure 5A:
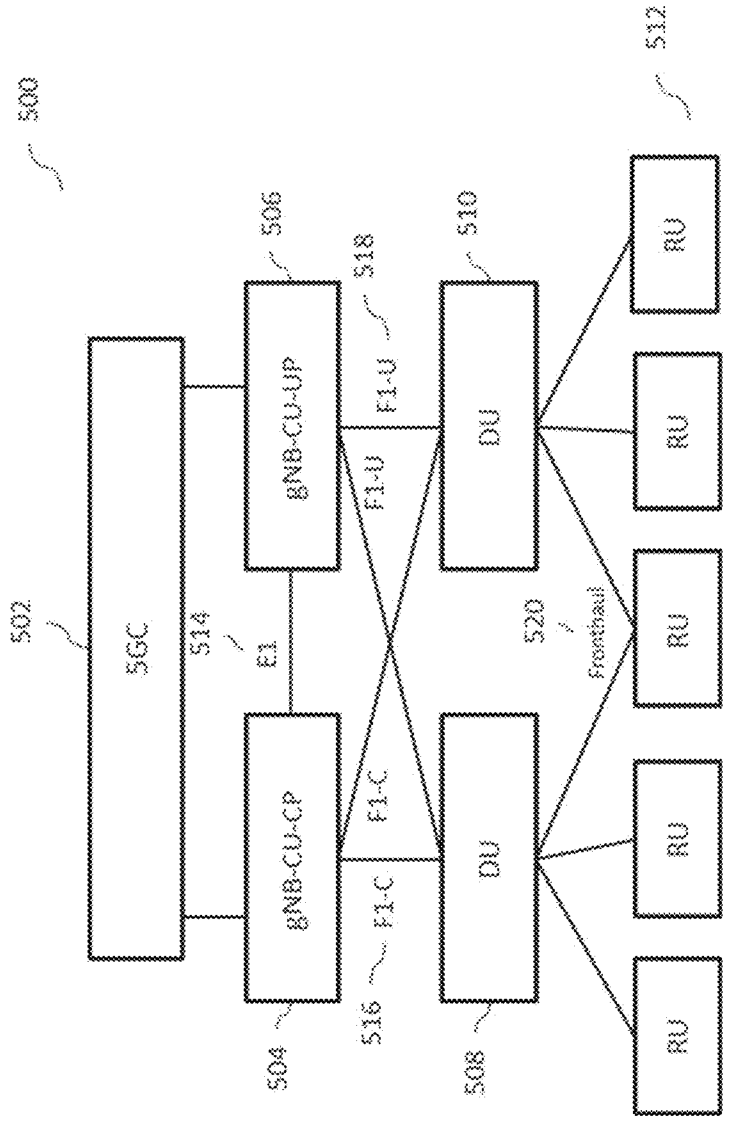
FIG. 5*a* illustrates an exemplary 5G wireless communication system.

FIG. 5*a* illustrates an exemplary 5G wireless communication system 500, according to some implementations of the current subject matter. The system 500 can be configured to have a lower layer split architecture in accordance with Option 7-2. The system 500 can include a core network 502 (e.g., 5G Core) and one or more gNodeBs (or gNBs), where the gNBs can have a centralized unit gNB-CU. The gNB-CU can be logically split into control plane portion, gNB-CU-CP, 504 and one or more user plane portions, gNB-CU-UP, 506. The control plane portion 504 and the user plane portion 506 can be configured to be communicatively coupled using an E1 communication interface 514 (as specified in the 3GPP Standard). The control plane portion 504 can be configured to be responsible for execution of the RRC and PDCP protocols of the radio stack.

The control plane and user plane portions 504, 506 of the centralized unit of the gNB can be configured to be communicatively coupled to one or more distributed units (DU) 508, 510, in accordance with the higher layer split ("HLS") architecture. The distributed units 508, 510 can be configured to execute RLC, MAC, and upper part of PHY layers protocols of the radio stack. The control plane portion 504 can be configured to be communicatively coupled to the distributed units 508, 510 using F1-C communication interfaces 516, and the user plane portions 506 can be configured to be communicatively coupled to the distributed units 508, 510 using F1-U communication interfaces 518. The distributed units 508, 510 can be coupled to one or more remote radio units (RU) 512 via a fronthaul network 520 (which may include one or switches, links, etc.), which in turn communicate with one or more user equipments (not shown in FIG. 5*a*). The remote radio units 512 can be configured to execute a lower part of the PHY layer protocols as well as provide antenna capabilities to the remote units for communication with user equipments (similar to the discussion above in connection with FIGS. 1*a*-2).

Figure 5B:
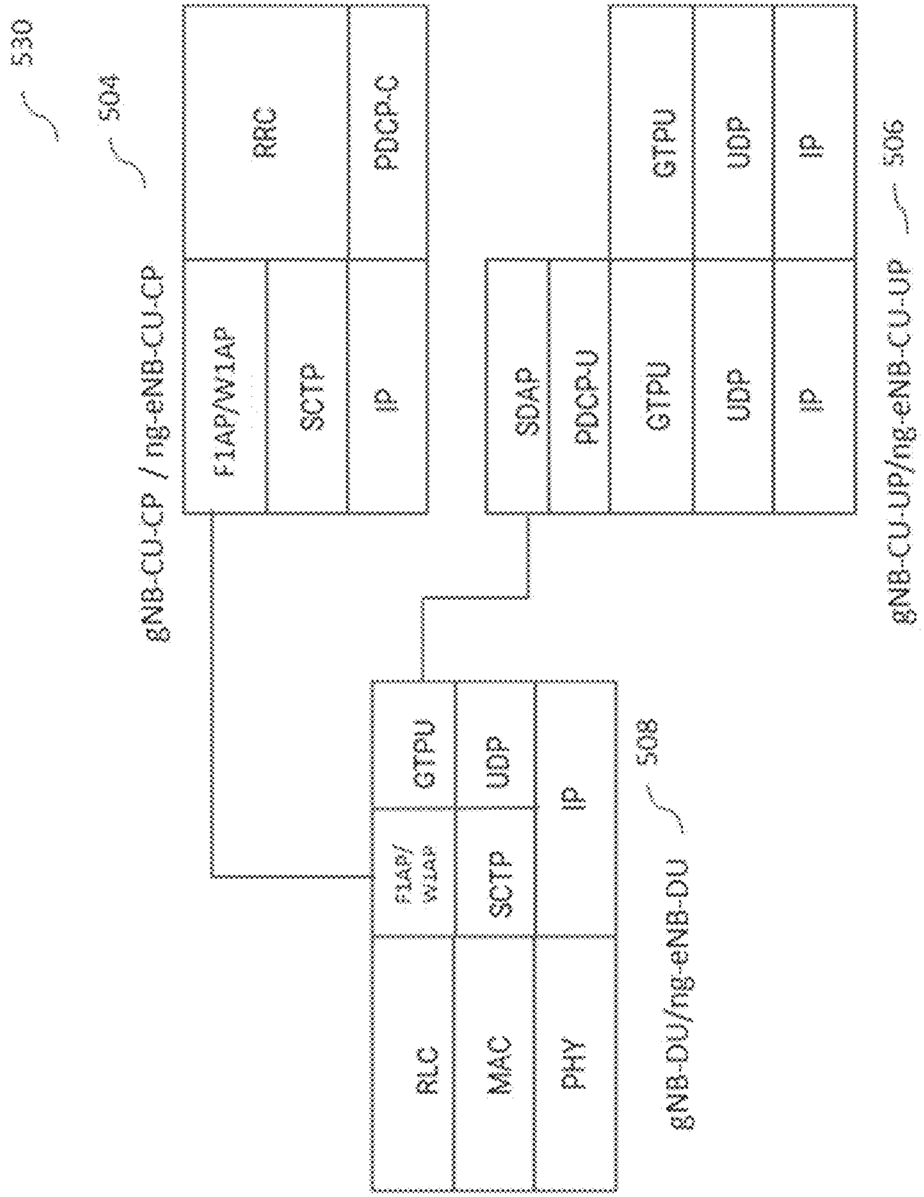
FIG. 5*b* illustrates an exemplary layer architecture of the split gNodeB ("gNB") and/or a split next generation evolved node B (e.g., next generation eNB that may be connected to 5G Core ("5GC"))

FIG. 5*b* illustrates an exemplary layer architecture of the split gNB. The architecture can be implemented in the communications system 500 shown in FIG. 5*a*, which can be configured as a virtualized disaggregated radio access network (RAN) architecture, whereby layers L1, L2, L3 and radio processing can be virtualized and disaggregated in the centralized unit(s), distributed unit(s) and radio unit(s). As shown in FIG. 5*b*, the gNB-DU 508 can be communicatively coupled to the gNB-CU-CP control plane portion 504 (also shown in FIG. 5*a*) and gNB-CU-UP user plane portion 506. Each of components 504, 506, 508 can be configured to include one or more layers.

The gNB-DU 508 can include RLC, MAC, and PHY layers as well as various communications sublayers. These can include an F1 application protocol ("F1-AP") sublayer, a GPRS tunneling protocol ("GTPU") sublayer, a stream control transmission protocol ("SCTP") sublayer, a user datagram protocol ("UDP") sublayer and an internet protocol (IP) sublayer. As stated above, the distributed unit 508 may be communicatively coupled to the control plane portion 504 of the centralized unit, which may also include F1-AP, SCTP, and IP sublayers as well as radio resource control, and PDCP-control ("PDCP-C") sublayers. Moreover, the distributed unit 508 may also be communicatively coupled to the user plane portion 506 of the centralized unit of the gNB. The user plane portion 506 may include service data adaptation protocol ("SDAP"), PDCP-user ("PDCP-U"), GTPU, UDP, and IP sublayers.

Figure 5C:
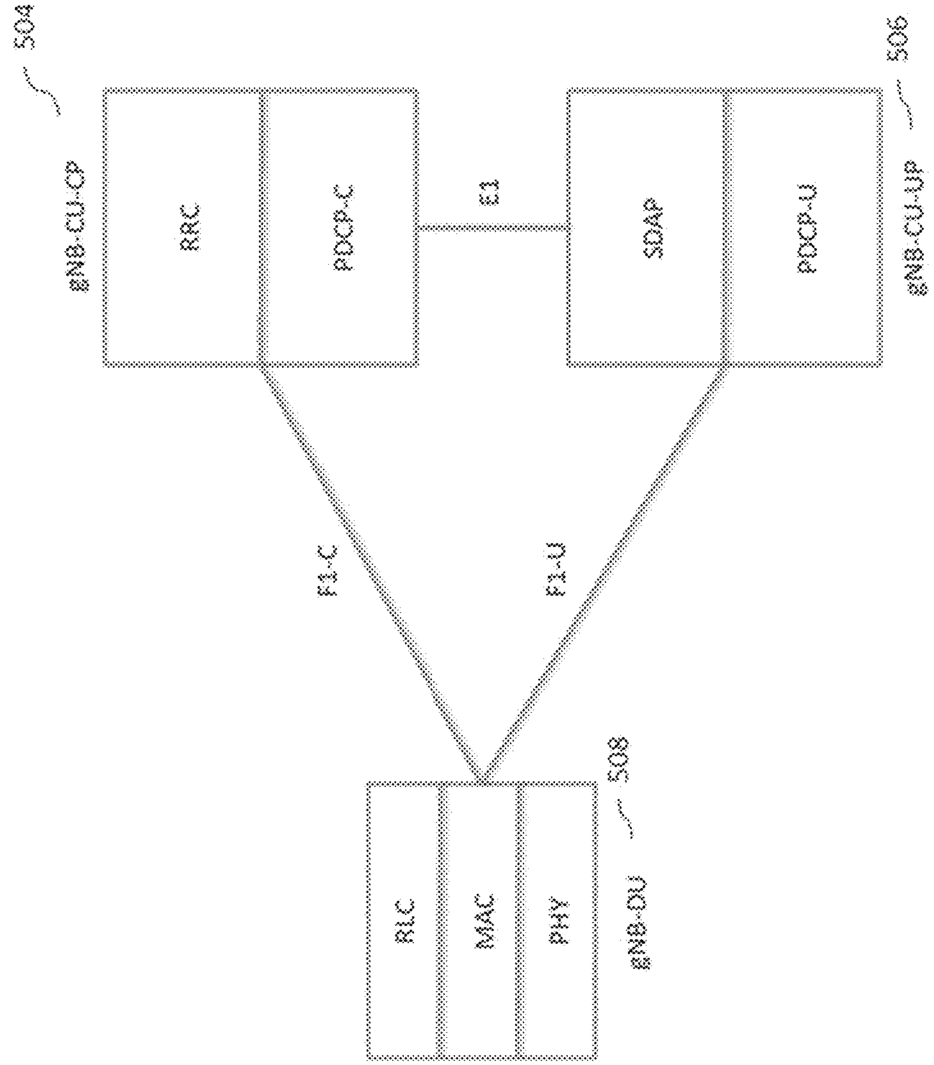
FIG. 5*c* illustrates an exemplary functional split in the gNB architecture shown in FIGS. 5*a-b;*

FIG. 5*c* illustrates an exemplary functional split in the gNB architecture shown in FIGS. 5*a-b*. As shown in FIG. 5*c*, the gNB-DU 508 may be communicatively coupled to the gNB-CU-CP 504 and GNB-CU-UP 506 using an F1-C communication interface. The gNB-CU-CP 504 and GNB-CU-UP 506 may be communicatively coupled using an E1 communication interface. The higher part of the PHY layer (or Layer 1) may be executed by the gNB-DU 508, whereas the lower parts of the PHY layer may be executed by the RUs (not shown in FIG. 5*c*). As shown in FIG. 5*c*, the RRC and PDCP-C portions may be executed by the control plane portion 504, and the SDAP and PDCP-U portions may be executed by the user plane portion 506.

Some of the functions of the PHY layer in 5G communications network can include error detection on the transport channel and indication to higher layers, forward error correction ("FEC") encoding/decoding of the transport channel, hybrid ARQ soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, MIMO antenna processing, digital and analog beamforming, and RF processing, as well as other functions.

The MAC sublayer of Layer 2 can perform beam management, random access procedure, mapping between logical channels and transport channels, concatenation of multiple MAC service data units ("SDUs") belonging to one logical channel into transport block (TB), multiplexing/demultiplexing of SDUs belonging to logical channels into/from TBs delivered to/from the physical layer on transport channels, scheduling information reporting, error correction through hybrid automatic repeat request ("HARQ"), priority handling between logical channels of one UE (user equipment), priority handling between UEs by means of dynamic scheduling, transport format selection, and other functions. The RLC sublayer's functions can include transfer of upper layer packet data units (PDUs), error correction through ARQ, reordering of data PDUs, duplicate and protocol error detection, re-establishment, etc. The PDCP sublayer can be responsible for transfer of user data, various functions during re-establishment procedures, retransmission of SDUs, SDU discard in the uplink, transfer of control plane data, and others.

Layer 3's RRC sublayer can perform broadcasting of system information to NAS and AS, establishment, maintenance and release of RRC connection, security, establishment, configuration, maintenance and release of point-point radio bearers, mobility functions, reporting, and other functions.

III. Sounding Reference Signal Analysis Based User Mobility Estimation

In some implementations, the current subject matter relates determining a mobility of a user equipment, namely whether the user is moving or stationary within a geographic area. As stated, such exemplary communications systems may include, but are not limited, to 4G LTE communications systems, 5G new radio ("NR") communications system, and/or any other communications systems.

Figure 6:
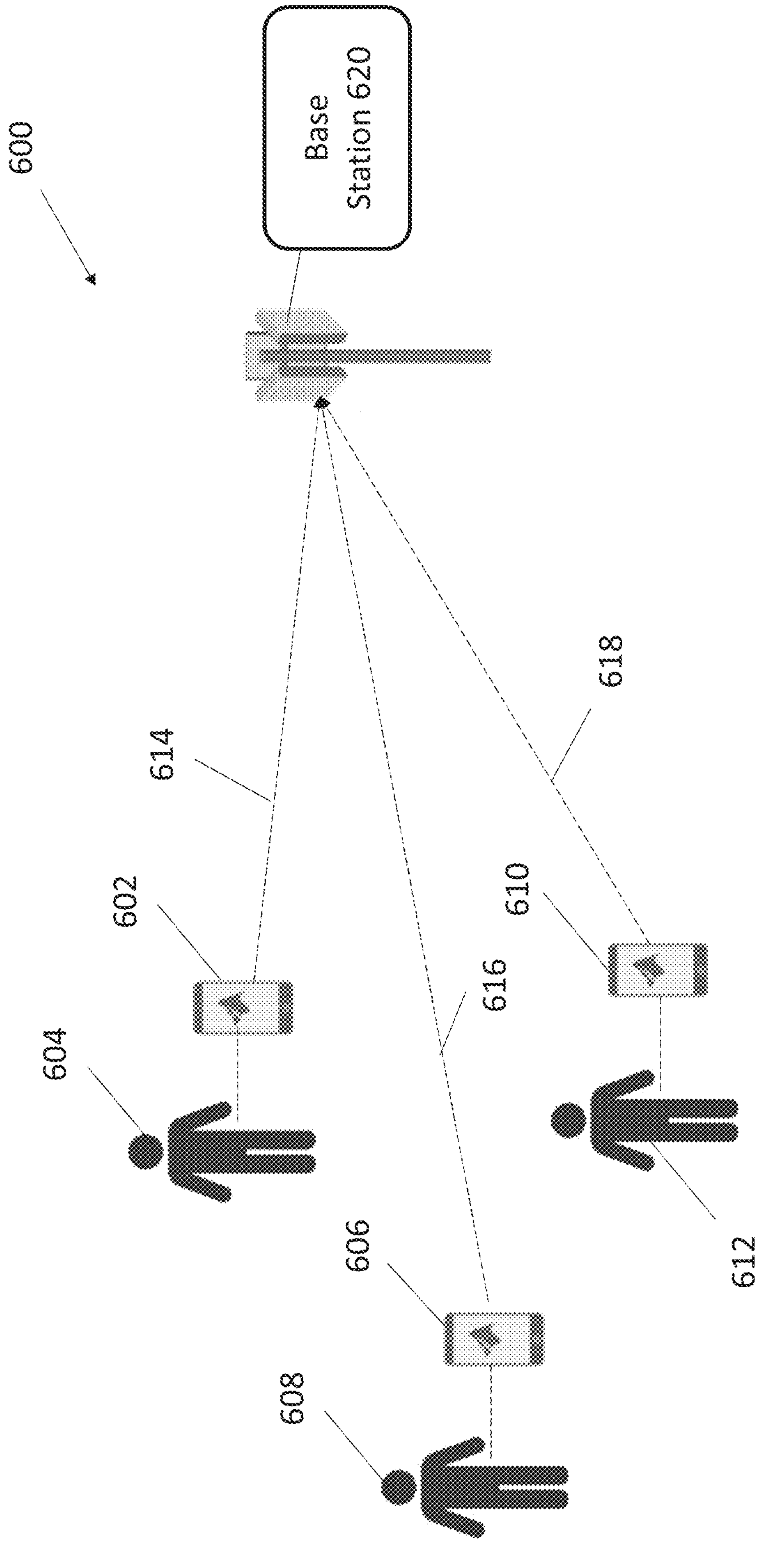
FIG. 6 illustrates an exemplary system that enables the determination of a mobility of a user equipment, according to some implementations of the current subject matter.

FIG. 6 illustrates example system 600 that enables the determination of a mobility of a user equipment, according to some implementations of the current subject matter.

The system 600 as illustrated in FIG. 6 includes user equipment in the form of smartphones phones, cellphones, and other comparable devices, which are associated with different users. For example, user equipment 602 is associated with an example user 604, user equipment 606 is associated with an example user 608, and user equipment 610 is associated with an example user 612. It is noted that each of these users may be located within a particular geographic area, e.g., a building, a city block, city, and so forth. Other larger geographic areas are also contemplated, e.g., across states, countries, and so forth. In aspects, each of the user equipment 602, 606, and 610 may generate example sounding reference signals (SRS) 614, 616, and 618, respectively, and transmit these signals, wirelessly, to a base station 620, which is external to each of the user equipment 602, 606, and 610. Sounding reference signals are signals that are utilized by base stations to determine a more accurate understanding of the uplink channel characteristics of a particular user equipment. For example, base stations (e.g., eNode, gNode within the base stations) may use the sounding reference signals to determine the quality of an uplink channel over a wider bandwidth, perform uplink frequency selective scheduling, and estimate uplink timing for the purpose of performing timing alignment procedures. Broadly speaking, there are three types of sounding reference signals: single sounding reference signal, periodic sounding reference signals, and aperiodic sounding reference signals.

As part of the implementation of the system as described in the present disclosure, the received sounding reference signals may be utilized to determine a mobility of each of the users 604, 608, and 612, namely whether a particular user is currently moving or stationary within a particular geographic area. Conventionally, as stated above, determining whether a user is moving or stationary is necessary in order to avoid or overcome beamforming inaccuracy.

Broadly speaking, beamforming refers to processing of signals for directional signal transmission or reception. This can be achieved by combining elements in an antenna in such a way that signals at particular angles experience constructive interference while others experience destructive interference. Beamforming can be used for transmission and receiving to achieve spatial selectivity. In wireless communications, there are two classes of beamforming: a direction of arrival beamforming (e.g., adjustment of receive or transmit antenna direction), and eigen beamforming (e.g., maximization of signal power at the receive antenna based on various criteria).

As stated above, beamforming associated with the UL may be applied to DL, which may result in a 2-3 millisecond delay. During this delay, if the user of a particular user equipment changes his location, the estimated or determined beamforming becomes obsolete and inaccurate. Additionally, as stated above, Doppler estimation may be utilized to determine the mobility of the particular user device, but Doppler estimation fails to account for the significant variation of the oscillator (system clock) of the user equipment. In various instances, the variation of the system clock may be significantly larger than the Doppler variation.

As such, in order to overcome the deficiency in conventional user mobility and tracking techniques, the determining the mobility of user equipments by analyzing one or more reference signals transmitted by a particular user equipment to a base station are contemplated. The processes involved in the implementation of the system as described in the present disclosure are described in greater detail below, in particular with respect to FIGS. 7*a*, 7*b*, 7*c*, and 9.

Figure 7A:
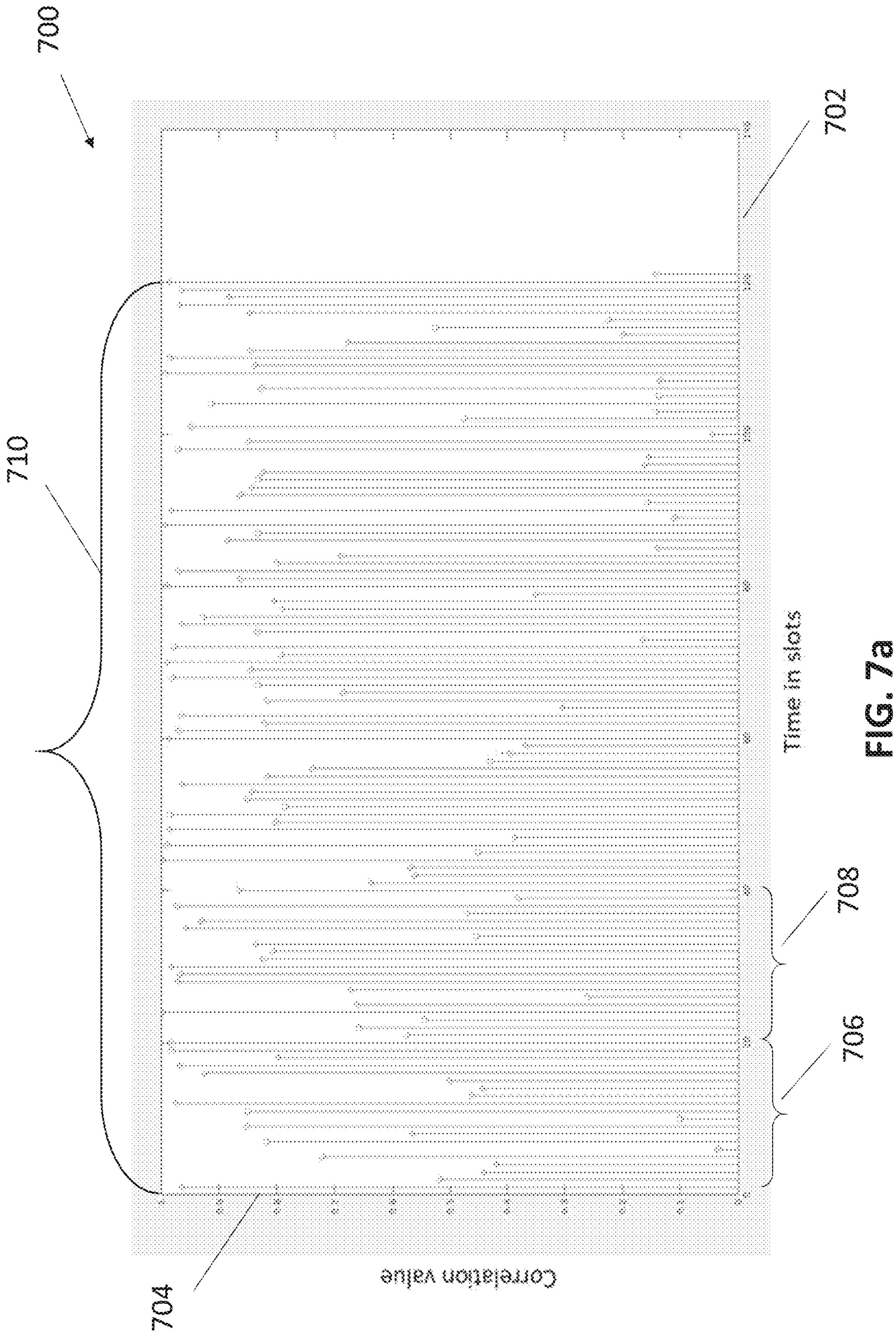
FIG. 7*a* illustrates a graphical representation that includes a plurality of correlation values associated with a plurality of sounding reference signals, according to some implementations of the current subject matter.

FIG. 7*a* illustrates a graphical representation 700 that includes a plurality of correlation values associated with a plurality of sounding reference signals, according to some implementations of the current subject matter. The graphical representation 700 includes an x-axis 702 that lists a plurality of time periods and a y-axis 704 that includes a plurality of correlation values associated with a plurality of sounding reference signals. In aspects, the plurality of time periods may be segmented or partitioned into 20 millisecond windows, ranging from 0 milliseconds to 120 milliseconds. During each time window of 20 milliseconds, a plurality of sounding reference signals 710 may be received by the base station 620 from, e.g., each of the user equipments 602, 606, and 610. In aspects, the plurality of sounding reference signals 710 may be transmitted by a single user equipment, e.g., user equipment 602, and received by the base station 620.

The received sounding reference signals 710, as shown in FIG. 7*a* may be received at various points within each 20 millisecond time window and the correlation value of each sounding reference signal may vary from another sounding reference signal received at a later point in time within each 20 millisecond time window. As previously stated, sounding reference signals are transmitted by user equipments to a base station in uplink in order to enable, e.g., the eNB, of the base station (e.g., base station 620) to determine channel state information, e.g., various properties of a communication link. For example, the channel state information (CSI) may describe the manner in which a physical signal propagates from the transmitter (e.g., of the user equipment 602) to the receiver (of the base station 620). The CSI associated with the example sounding reference signal 614 may include or be representative of scattering, fading, and power decay over a particular distance.

Figure 7B:
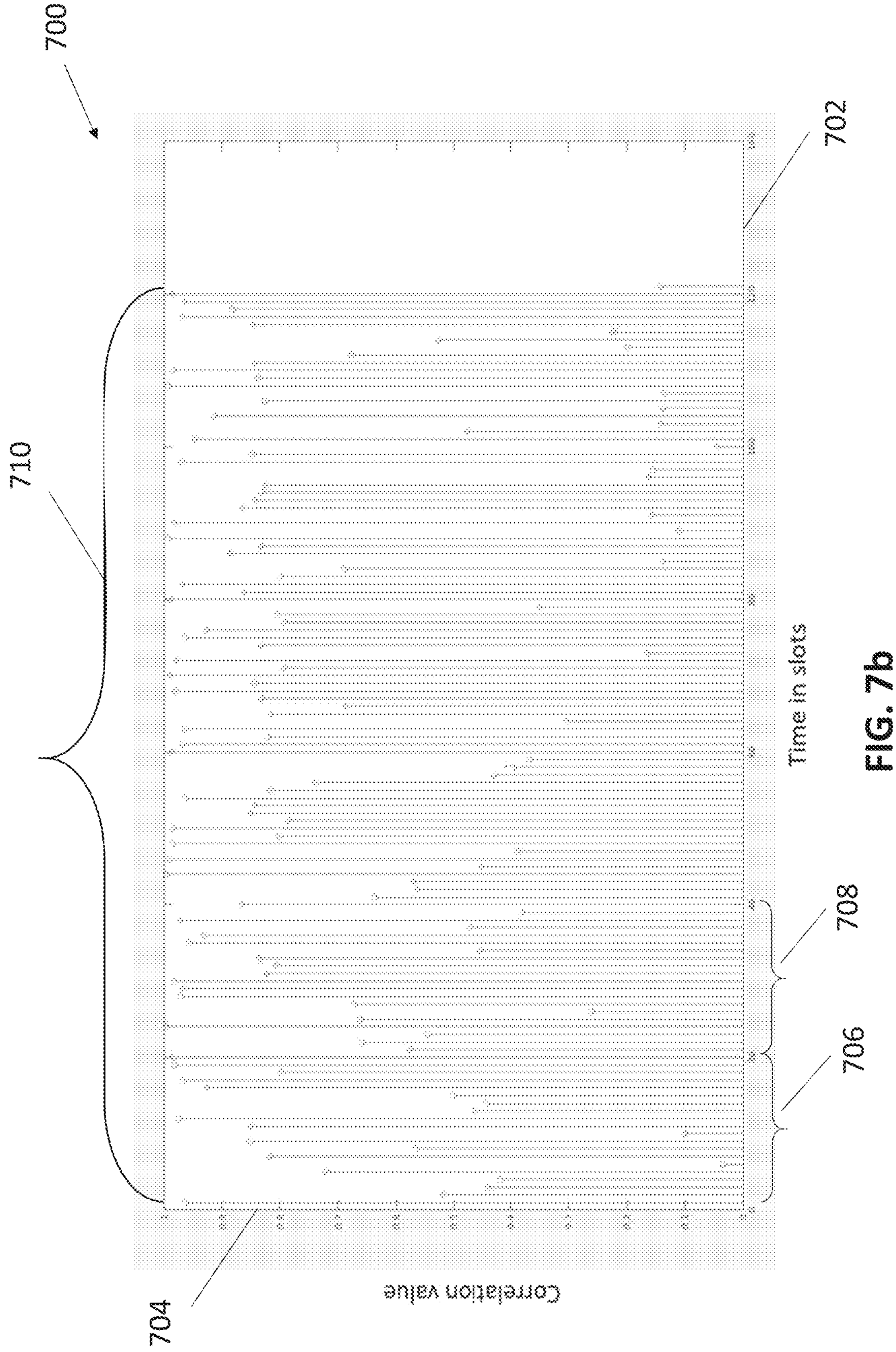
FIG. 7*b* illustrates an exemplary system, according to some implementations of the current subject matter.

FIG. 7*b* illustrates an example implementation of the system of the present disclosure that involves extracting and analyzing a subset of correlation values located across multiple 20 millisecond time windows, namely first time window 706 and example second time window 708. As previously stated, a processing operation may be performed relative to the DL for the purpose of applying the beamforming parameter of the UL to the DL, as a result of which a delay of a few milliseconds, e.g., 2-3 milliseconds may be generated. This delay may, in turn, result in the channel experience various changes that may render the beamforming parameter inaccurate and/or ineffective. To overcome this deficiency, the processes illustrated in FIGS. 7*b* and 7*c* and which are described below may be implemented.

Returning to FIG. 7*b*, the first time window 706 includes a plurality of correlation values representative of a plurality of sounding reference signals such that the lowest correlation value in the first time window 706 is approximately 0.3 and the highest correlation value is approximately 0.9. Additionally, the second time window 708 includes a plurality of additional correlation values representative of an additional plurality of sounding references signals such that the lowest correlation value in the second time window 708 is approximately 0.28 and the higher correlation value in the second time window is 0.9. From these sets of correlation values, a first subset of correlation values and a second subset of correlation values may be extracted and further processed.

Figure 7C:
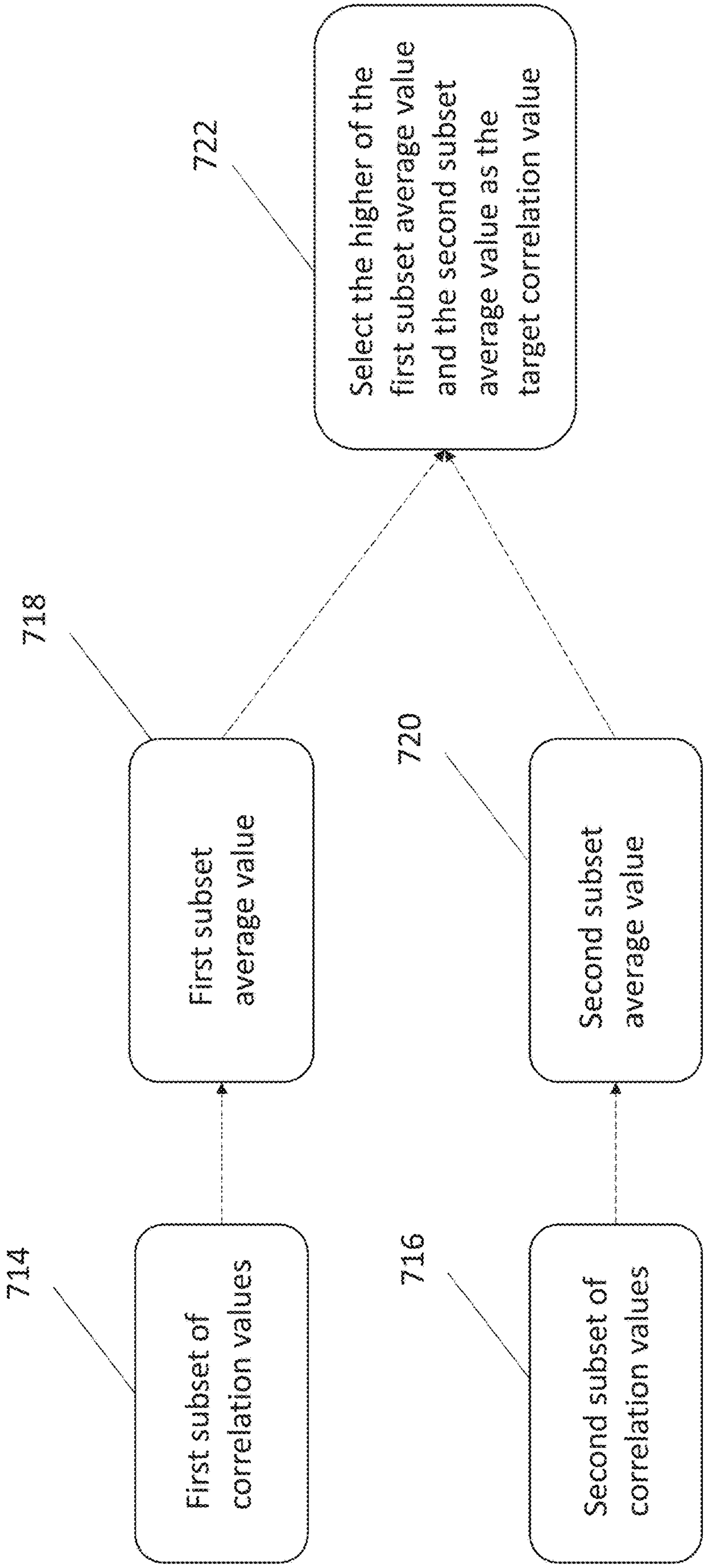
FIG. 7*c* illustrates an exemplary process flow, according to some implementations of the current subject matter.

FIG. 7*c* illustrates a process flow descriptive of an example implementation of the system of the present disclosure that involves determining multiple correlation value averages and selecting an average correlation value based on a correlation threshold value, according to some implementations of the current subject matter. In particular, a first subset 714 of correlation values and a second subset 716 of correlation values may be selected. Regarding the first subset 714 of correlation values, a number of correlation values within the first time window 706 may be selected such that, e.g. 20 correlations values may be selected across the first time window 706. Similarly, regarding the second subset 716, another number of correlation values within the second time window 708 may be selected such that, e.g., 20 correlations values may be selected across the second time window 708.

Thereafter, five values in the higher range of the correlation values may be selected, by one or more processors of the base station 620, from each of the first subset 714 of correlation values and the second subset 716 of correlation values. For example, the highest value, the second highest value, the third highest value, the fourth highest value, and the fifth highest value may be selected from each of the first subset 714 and the second subset 716. Subsequent to this extraction, the one or more processors of the base station 620 may determine a first subset average value 718 by averaging the selected the highest value, the second highest value, the third highest value, the fourth highest value, and the fifth highest value from the first subset 714 of correlation values, and determine a second subset average value 720 by averaging the selected highest value, the second highest value, the third highest value, the fourth highest value, and the fifth highest value from the second subset 716 of correlation values. Finally, the one or more processors of the base station 620 selects the higher of the first subset average value 718 and the second subset average value 720 as the target correlation value 722.

The target correlation value 722 is representative of whether a particular individual, e.g. the user 604 associated with the user equipment 602 is stationary or mobile within a particular geographic area. In aspects, if the target correlation value 722 is less than. 5, then the one or more processors of the base station 620 may determine that the user associated with the user equipment 602 (e.g., the user equipment from which the sounding reference signals were received) is moving from one location to another within a geographic area. In contrast, if the correlation value 722 is higher than 0.5 and in the range of 0.6 to 0.9, the one or more processors of the base station 620 may determine that the user is stationary and not mobile within a geographic area. In other words, a high correlation corresponds to or is indicative of a stationary user and a low correlation corresponds to or is indicative of a mobile user.

It is noted that, in additional to the techniques described above, additional techniques of determining a mobility of a user equipment are also contemplated. One such technique includes sampling the sounding reference signal channel at a higher rate and performing an inverse fast Fourier transform (IFFT) at a higher sampling rate in order to capture a timing peak at a better sampling rate. Another such technique includes compensating for predefined timing estimates in the frequency domain and then extracting a maximum of all the correlation values as the target correlation value.

Figure 8:
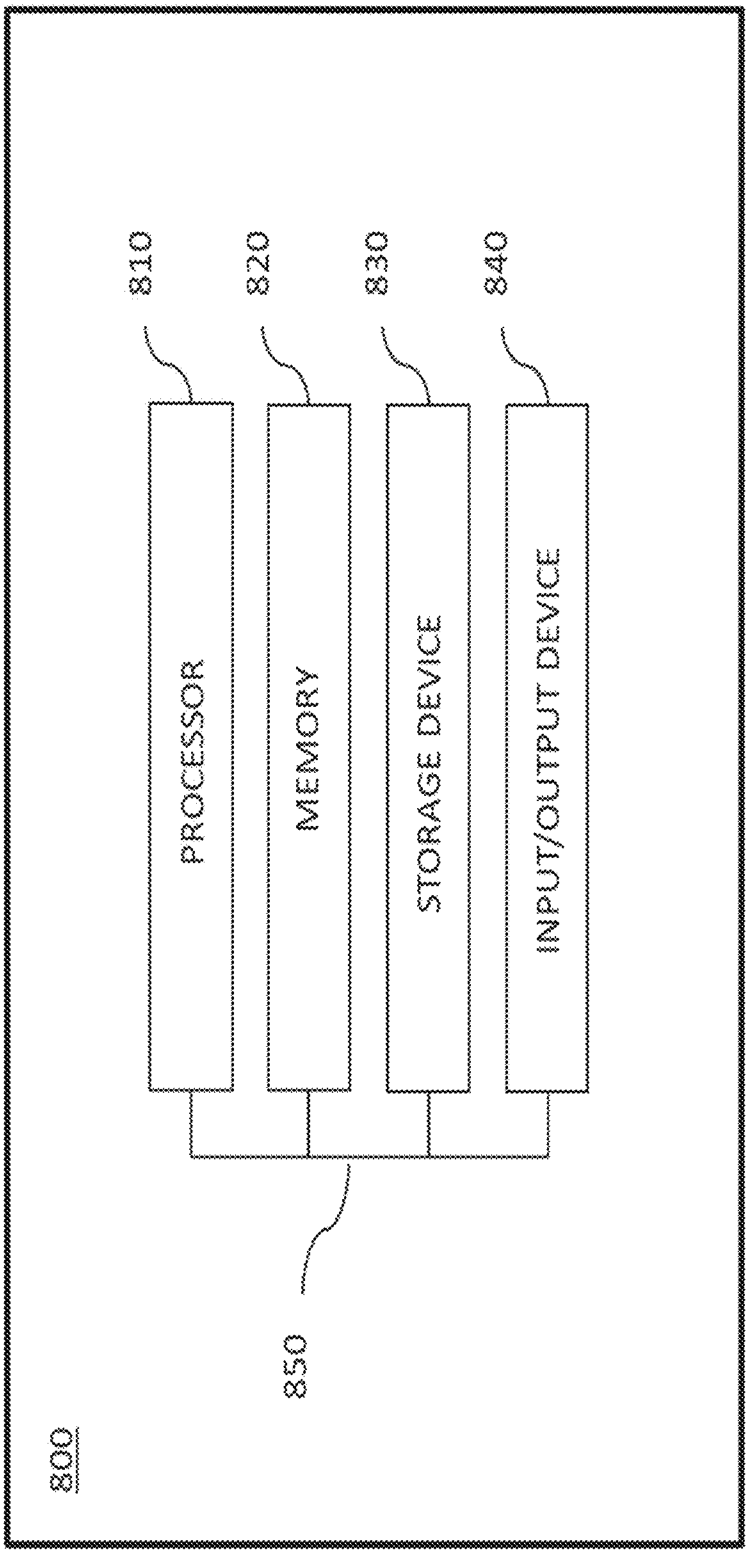
FIG. 8 illustrates an exemplary system, according to some implementations of the current subject matter.

In some implementations, the current subject matter can be configured to be implemented in a system 800, as shown in FIG. 8. The system 800 can include one or more of a processor 810, a memory 820, a storage device 830, and an input/output device 840. Each of the components 810, 820, 830, 840 can be interconnected using a system bus 850. The processor 810 can be configured to process instructions for execution within the system 800. In some implementations, the processor 810 can be a single-threaded processor. In alternate implementations, the processor 810 can be a multi-threaded processor. The processor 810 can be further configured to process instructions stored in the memory 820 or on the storage device 830, including receiving or sending information through the input/output device 840. The memory 820 can store information within the system 800. In some implementations, the memory 820 can be a computer-readable medium. In alternate implementations, the memory 820 can be a volatile memory unit. In yet some implementations, the memory 820 can be a non-volatile memory unit. The storage device 830 can be capable of providing mass storage for the system 800. In some implementations, the storage device 830 can be a computer-readable medium. In alternate implementations, the storage device 830 can be a floppy disk device, a hard disk device, an optical disk device, a tape device, non-volatile solid state memory, or any other type of storage device. The input/output device 840 can be configured to provide input/output operations for the system 800. In some implementations, the input/output device 840 can include a keyboard and/or pointing device. In alternate implementations, the input/output device 840 can include a display unit for displaying graphical user interfaces.

Figure 9:
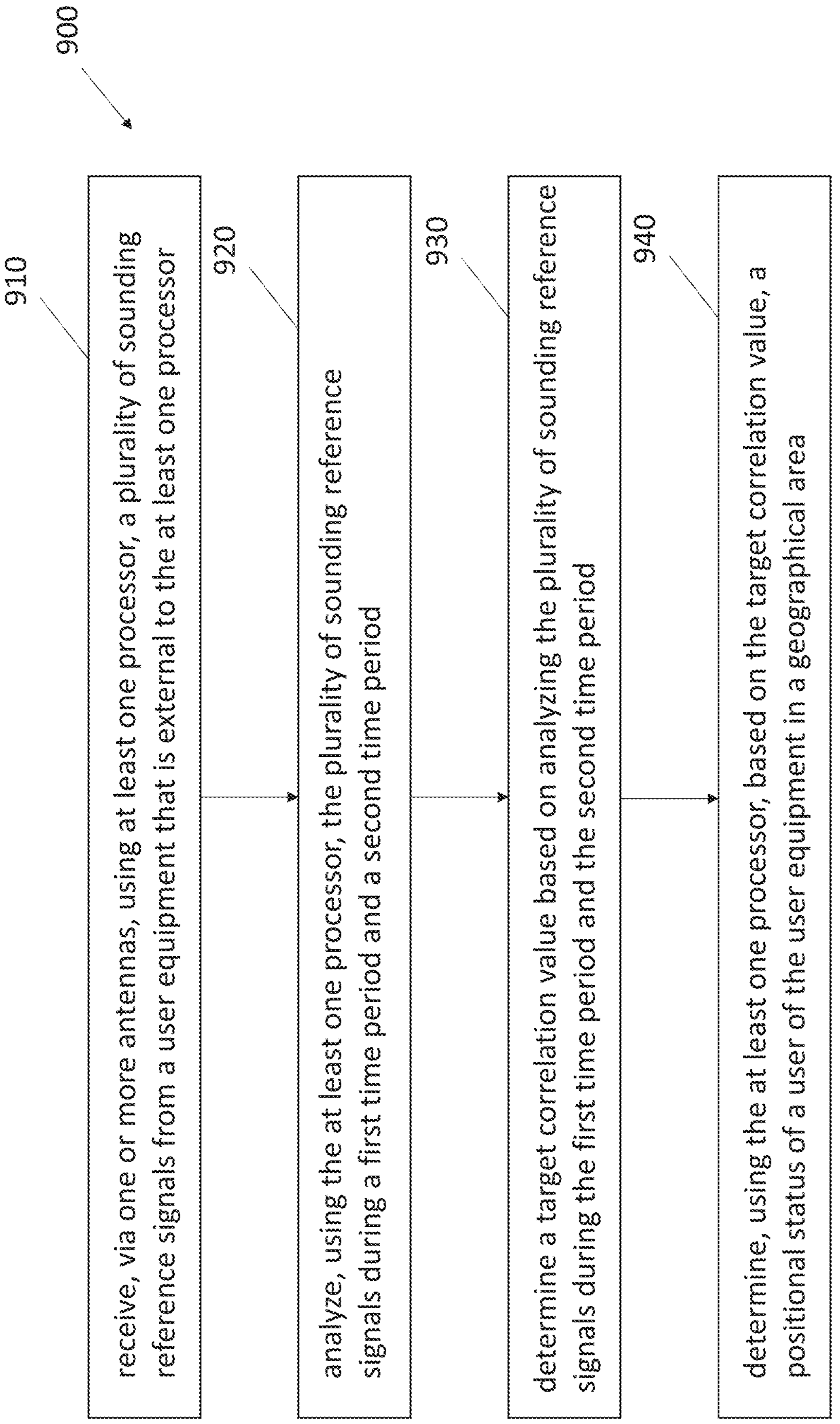
FIG. 9 illustrates an exemplary method of determining a mobility of a UE, according to some implementations of the current subject matter.

FIG. 9 illustrates an example method 900 of determining a mobility of a user equipment, according to some implementations of the current subject matter. The example method 900 may be implemented entirely by a base station, e.g., the base station 620 of FIG. 6, which may receive sounding reference signals from user equipments 602, 606, and 610.

The example method 900 includes receiving 910, via one or more antennas, using at least one processor, a plurality of sounding reference signals from a user equipment that is external to the at least one processor, analyzing 920, using the at least one processor, the plurality of sounding reference signals during a first time period and a second time period, determining 930, using the at least one processor, a target correlation value based on analyzing the plurality of sounding reference signals during the first time period and the second time period, and determining 940, using the at least one processor, based on the target correlation value, a mobility of the user equipment in a geographical area.

In aspects, the sounding reference signals may be received 910 by one or more antennas that are mounted on a base station (e.g., the base station 620). Further, the at least one processor (e.g., the processor 810) may operate to process the received 910 sounding reference signals.

In aspects, as described above, the processor 810 of the base station 620 may analyze a plurality of sounding reference signals received over a plurality of time windows, e.g., a plurality of 20 millisecond time windows as illustrated in FIGS. 7*a* and 7*b*. In particular, the analyzing may involve determining a first candidate correlation values associated with a first set of the plurality of sounding reference signals received by the one or more antennas during the first time period, and determining a second candidate correlation values associated with a second set of the plurality of sounding reference signals received by the one or more antennas during the second time period. As illustrated in FIGS. 7*a*, 7*b*, and 7*c*, the first candidate correlation values and the second candidate correlation values correspond to the first subset 714 of correlation values and the second subset 716 of correlation values, respectively, as described above with respect to FIG. 7*c*. Additionally, the first time period and the second time period corresponds to a time period having a length of 20 milliseconds.

The determining 930 of the target correlation value can include correcting for one or more timing errors associated with the user equipment, e.g., the user equipment 602 associated with the user 604. In aspects, the determining of the target correlation value is a multi-step process. In particular, as part of the determining of the target correlation value. The first candidate correlation values, which are described above with respect to 920, may be compared with a correlation threshold value, e.g., a predefined value such as 0.5, 0.6, or 0.7. It is noted the correlation values are in a range from 0 to 1.

Thereafter, the processor of the base station 620 (e.g., the processor 810) may select a first subset of the candidate correlation values, namely correlation values that satisfy the correlation threshold value, e.g., values that are above 0.5, above 0.6, or above 0.7. The processor 810 may select a second subset of the candidate correlation values in a similar manner. The processor 810 may then determine a first subset average value which is an average of all of the values in the first subset of the candidate correlation values. The processor 810 may also determine a second subset average value which is an average of all of the values in the second subset of the candidate correlation values. Thereafter, in order to determine the target correlation value, the processor 810 may select the higher of the first subset average value and the second subset average value as the target correlation value. If the target correlation value is above a particular threshold, then the base station 620 may determine that the user (e.g., user 604) is mobile within a geographic area. If, however, the target correlation value is below a particular threshold, the base station 620 may determine that the user (e.g., user 604) is stationary within a geographic area.

In some implementations, the current subject matter can include one or more of the following optional features.

In some implementations, the mobility of the user equipment in the geographical area can correspond to one of the user being mobile or the user being stationary.

In some implementations, each of the first time period and the second time period can have a length of 20 milliseconds.

In some implementations, the analyzing of the plurality of sounding references signals can include determining a first candidate correlation values associated with a first set of the plurality of sounding reference signals received by the one or more antennas during the first time period, and determining a second candidate correlation values associated with a second set of the plurality of sounding reference signals received by the one or more antennas during the second time period. Further, the determining of the target correlation value can include correcting for one or more timing errors associated with the user equipment. Further, the correcting for the one or more timing errors can include comparing the first candidate correlation values with a correlation threshold value, selecting a first subset of the first candidate correlation values, the first subset including candidate correlation values that satisfy the correlation threshold value, and determining a first subset average value using the candidate correlation values included in the first subset that satisfy the correlation value threshold. Further, the determining of the target correlation value can include comparing the second candidate correlation values with the correlation threshold value, selecting a second subset of the second candidate correlation values, the second subset including candidate correlation values that satisfy the correlation threshold value. Further, a second subset average value can be determined using the candidate correlation values included in the second subset that satisfy the correlation value threshold. Further, the first subset average value and the second subset average value can be compared and a higher of the first subset average value and the second subset average value may be selected, and the higher of the first subset average value and the second subset average value can be the target correlation value.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices ("PLDs"), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube ("CRT") or a liquid crystal display ("LCD") monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.s The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A method, comprising:

receiving, via one or more antennas, a plurality of sounding reference signals from a user equipment (UE);

analyzing, the plurality of sounding reference signals during a first time period and a second time period;

determining, a target correlation value based on analyzing the plurality of sounding reference signals during the first time period and the second time period; and determining, based on the target correlation value, a mobility of the UE in a geographical area.

2. The method according to claim 1, wherein the mobility of the UE in the geographical area corresponds to one of the UE being mobile or the UE being stationary, such that the determining determines whether the UE is stationary or mobile based on a comparison of the target correlation value to a predetermined threshold value.

3. The method according to claim 1, wherein the analyzing of the plurality of sounding reference signals comprises:

determining a first candidate correlation values associated with a first set of the plurality of sounding reference signals received by the one or more antennas during the first time period; and determining a second candidate correlation values associated with a second set of the plurality of sounding reference signals received by the one or more antennas during the second time period.

4. The method according to claim 1, wherein the determining of the target correlation value comprises correcting for one or more timing errors associated with the UE.

5. The method according to claim 4, wherein the correcting for the one or more timing errors comprises:

comparing the first candidate correlation values with a correlation threshold value;

selecting a first subset of the first candidate correlation values, the first subset including candidate correlation values that satisfy the correlation threshold value; and determining a first subset average value using the candidate correlation values included in the first subset that satisfy the correlation value threshold.

6. The method according to claim 4, wherein the determining of the target correlation value comprising:

comparing the second candidate correlation values with the correlation threshold value;

selecting a second subset of the second candidate correlation values, the second subset including candidate correlation values that satisfy the correlation threshold value; and determining a second subset average value using the candidate correlation values included in the second subset that satisfy the correlation value threshold.

7. The method according to claim 4, further comprising:

comparing the first subset average value and the second subset average value; and selecting a higher of the first subset average value and the second subset average value, the higher of the first subset average value and the second subset average value is the target correlation value.

8. An apparatus, configured to perform operations comprising:

receiving, via one or more antennas, using the at least one processor, a plurality of sounding reference signals from a user equipment (UE);

analyzing the plurality sounding reference signals during a first time period and a second time period;

determining a target correlation value based on analyzing the plurality of sounding reference signals during the first time period and the second time period; and determining based on the target correlation value, a mobility of the UE in a geographical area.

9. The apparatus of claim 8, wherein the mobility of the UE in the geographical area corresponds to one of the user being mobile or the user being stationary, such that the determining determines whether the UE is stationary or mobile based on a comparison of the target correlation value to a predetermined threshold value.

10. The apparatus according to claim 8, wherein one of the operations of the analyzing of the plurality of sounding reference signals comprises:

determining a first candidate correlation values associated with a first set of the plurality of sounding reference signals received by the one or more antennas during the first time period; and determining a second candidate correlation values associated with a second set of the plurality of sounding reference signals received by the one or more antennas during the second time period.

11. The apparatus according to claim 8, wherein one of the operations of the determining of the target correlation value comprises correcting for one or more timing errors associated with the user equipment.

12. The apparatus according to claim 11, wherein one of the operations of the correcting for the one or more timing errors comprising:

comparing the first candidate correlation values with a correlation threshold value;

selecting a first subset of the first candidate correlation values, the first subset including candidate correlation values that satisfy the correlation threshold value; and determining a first subset average value using the candidate correlation values included in the first subset that satisfy the correlation value threshold.

13. The apparatus according to claim 11, wherein the operations further comprising:

comparing the second candidate correlation values with the correlation threshold value;

selecting a second subset of the second candidate correlation values, the second subset including candidate correlation values that satisfy the correlation threshold value; and determining a second subset average value using the candidate correlation values included in the second subset that satisfy the correlation value threshold.

14. The apparatus according to claim 11, wherein the operations further comprising:

comparing the first subset average value and the second subset average value; and selecting a higher of the first subset average value and the second subset average value, the higher of the first subset average value and the second subset average value is the target correlation value.

15. At least one non-transitory storage media storing instructions that, when executed by at least one processor, cause the at least one processor to perform operations comprising:

receiving via one or more antennas, using the at least one processor, a plurality of sounding reference signals from a user equipment (UE) that is external to the at least one processor;

analyzing the plurality sounding reference signals during a first time period and a second time period;

determining a target correlation value based on analyzing the plurality of sounding reference signals during the first time period and the second time period; and determining, based on the target correlation value, a mobility of the UE in a geographical area.

16. The at least one non-transitory storage media of claim 15, wherein the mobility of the UE in the geographical area corresponds to one of the UE being mobile or the user being stationary, such that the determining determines whether the UE is stationary or mobile based on a comparison of the target correlation value to a predetermined threshold value.

17. The at least one non-transitory storage media of claim 15, wherein one of the operations of the analyzing of the plurality of sounding reference signals comprises:

determining a first candidate correlation values associated with a first set of the plurality of sounding reference signals received by the one or more antennas during the first time period; and determining a second candidate correlation values associated with a second set of the plurality of sounding reference signals received by the one or more antennas during the second time period.

18. The at least one non-transitory storage media of claim 15, wherein one of the operations of the determining of the target correlation value comprises correcting for one or more timing errors associated with the user equipment.

19. The at least one non-transitory storage media of claim 18, wherein one of the operations of the correcting for the one or more timing errors comprising:

comparing the first candidate correlation values with a correlation threshold value;

selecting a first subset of the first candidate correlation values, the first subset including candidate correlation values that satisfy the correlation threshold value; and determining a first subset average value using the candidate correlation values included in the first subset that satisfy the correlation value threshold.

20. The at least one non-transitory storage media of claim 18, wherein the operations further comprising:

comparing the second candidate correlation values with the correlation threshold value;

selecting a second subset of the second candidate correlation values, the second subset including candidate correlation values that satisfy the correlation threshold value; and determining a second subset average value using the candidate correlation values included in the second subset that satisfy the correlation value threshold.

* * * * *